United States Patent [19]
Davey

[11] 4,374,659
[45] Feb. 22, 1983

[54] MULTIPLE GOB SHEARING APPARATUS
[75] Inventor: Donald G. Davey, Oregon, Ohio
[73] Assignee: Owens-Illinois, Inc., Toledo, Ohio
[21] Appl. No.: 333,831
[22] Filed: Dec. 23, 1981
[51] Int. Cl.³ .............................................. C03B 5/38
[52] U.S. Cl. .................................................... 65/334
[58] Field of Search .......................... 65/303, 332, 334
[56] References Cited
U.S. PATENT DOCUMENTS

| 1,623,362 | 4/1927 | Rule ................................. 65/303 X |
| 2,681,530 | 6/1954 | Peiler . |
| 3,792,992 | 2/1974 | Brymer ................................. 65/303 |
| 4,174,647 | 11/1979 | Dahms ............................. 65/334 X |

FOREIGN PATENT DOCUMENTS 2818234 4/1978 Fed. Rep. of Germany ........ 65/334

1476871 6/1977 United Kingdom .................. 65/332

Primary Examiner—Robert L. Lindsay, Jr.
Attorney, Agent, or Firm—D. T. Innis; M. E. Click; D. H. Wilson

[57] ABSTRACT

The apparatus disclosed for severing gobs issuing its stream from a glass feeder. The shearing mechanism takes the form of two sets, or pairs, of shear blades mounted from diametrically opposed positions relative to the bowl of the feeder. A single cam drives through multiple linkage mechanisms to operate the two pairs of shear mechanisms and synchronisms so that the gobs will be all sheared at the same instant. The links in the linkage mechanism all are provided with the usual adjustments, as to lengths, in order to provide that adjustment after setup which is normally necessary to assure the proper operation of the shears.

3 Claims, 3 Drawing Figures

4,374,659

MULTIPLE GOB SHEARING APPARATUS

BACKGROUND OF THE INVENTION

It has become the practice in the manufacture of blown glass containers to, through evolutionary steps, increase the output of the IS machine from single gob to double gob, and most recently to triple gob operations with each section of the machine producing three blown containers in each cycle of the machine. The limitations in the past, with regard to the number of gobs which could be formed and delivered to an IS machine, has been generally dictated by availability of glass to a forehearth which extends from the melting furnace to a position overlying the glass forming machine. It should be understood that the forehearth brings the glass to a position adjacent the machine, where the glass may be fed through a feeder which will normally be at the extreme end of the forehearth. The feeder is elevated above the machine, and the streams of glass that issue from the feeder are severed into individual gobs, or mold charges, and delivered by gravity through chutes to the sections of the individual section glass forming machine positioned therebelow. As previously stated, the most recent forming machines have been of the type which will receive three gobs simultaneously and; therefore, it has been the practice to sever three gobs simultaneously for delivery to the individual sections of the IS machine being operated.

In a very recent development, disclosed in U.S. Application Ser. No. 166,224 filed July 7, 1980 in the name of Kirkman and Sherman, and assigned to the assignee of the instant application, there is shown a molten glass feeder of a unique configuration capable of delivering four or possibly more, gobs simultaneously from the feeder. Actually, the glass will be fed to the unique feeder orifice arrangement and the severing of the glass into gobs will occur beneath this feeder, or bowl, as is sometimes the term used in referring to the end of the forehearth, in which the glass accumulates and will be fed by means of gravity from the bottom thereof.

In this application there is shown a system by which four gobs, in line, are being simultaneously formed. The present invention is specifically directed to the mechanism for shearing these four gobs and is capable of shearing the gobs uniformly and simultaneously by the operation and action of a single driven cam. Obviously, it is necessary that the gobs arrive at the same section at precisely the same time. The machine will handle the glass and form the glass into parisons and move the glass from the parison molds to the blow molds and from the blow molds will be taken out of the machine. All of these operations which occur at each of the sections, occur in very limited time intervals. Thus, it is essential that not only the gobs arrive at the machine sections at essentially the same instance, but also that the gobs which are being severed be severed at the same instant in order to insure that they be of the same weight. One example of a typical, double gob, shear mechanism is illustrated in U.S. Pat. No. 2,681,530 issued June 22, 1941. The mechanism shown and described in this patent shows how the shear arms are mounted to be driven, as a pair, and shows details of what are termed "drop guides" that maintain the gobs in generally vertical altitude after severence. These guides are not shown in conjunction with the present invention, however their use would normally be present. They were omitted in the interest of simplification.

With the foregoing in view, it is an object of this invention to provide a mechanism for shearing four or more gobs of glass simultaneously from four or more streams of molten glass.

SUMMARY OF THE INVENTION

Apparatus for shearing four or more streams of molten glass into gobs, or mold charges simultaneously under the influence of a motor driven cam which operates two pairs of shear blade carrying arms in which each pair of shear arms are pivoted between a position where the blades overlap on the axis of two or more streams while the other pair of shear arms are pivoted so its shear blades overlap on the axis of the remaining two or more streams of glass. The pivot axes for each pair are positioned in diametrically opposed relationship with respect to each other in relation to the feeder axis.

DETAILED DESCRIPTION OF DRAWING

Figure 3:
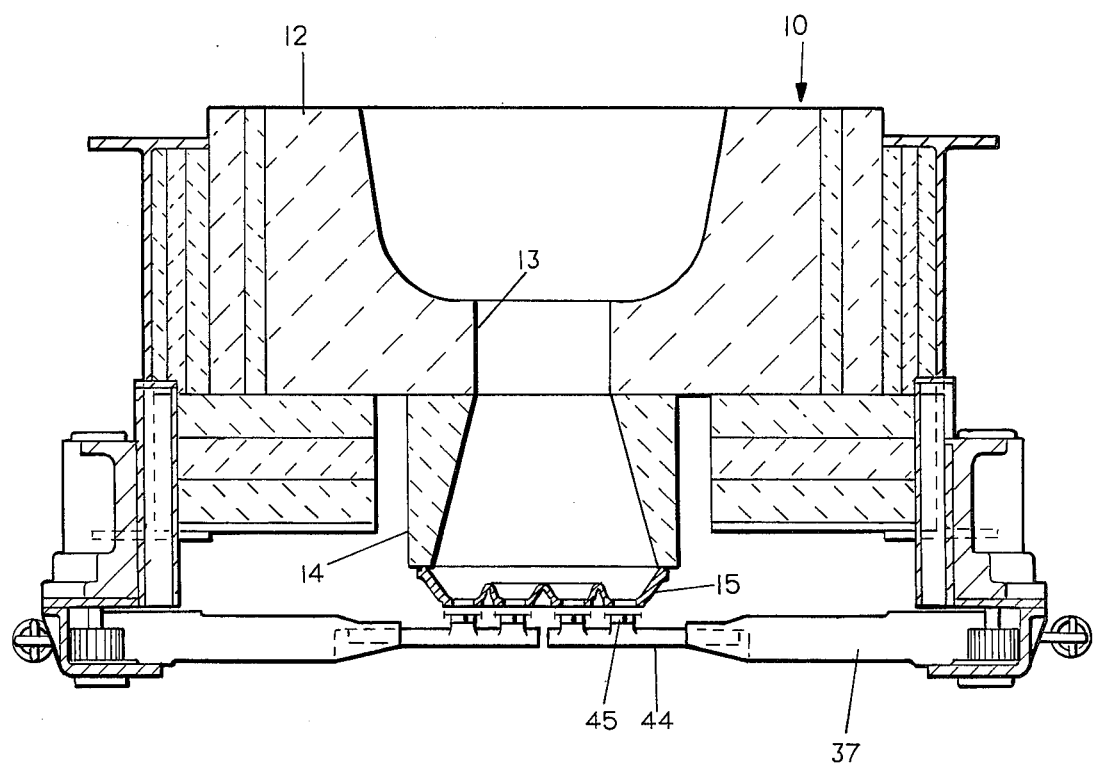
FIG. 3 is a cross-sectional view taken at line 3—3 of FIG. 1.

With particular reference to the drawings, there is shown a feeder bowl 10 positioned at the forward end of a forehearth, generally designated 11. The feeder bowl, perhaps as best illustrated in FIG. 3, is comprised of a ceramic channel member 12 which has a lower opening 13 therein. This lower opening 13 is in alignment with a spout extension 14. The details of the feeder and spout extension, along with the orifice pan 15, are provided in the above referred to U.S. application Ser. No. 166,224. At the forward end 16 of the feeder bowl there is provided a generally horizontal platform 17. This platform 17 serves as the support and mounting for a cam drive, generally designated 18.

Figure 1:
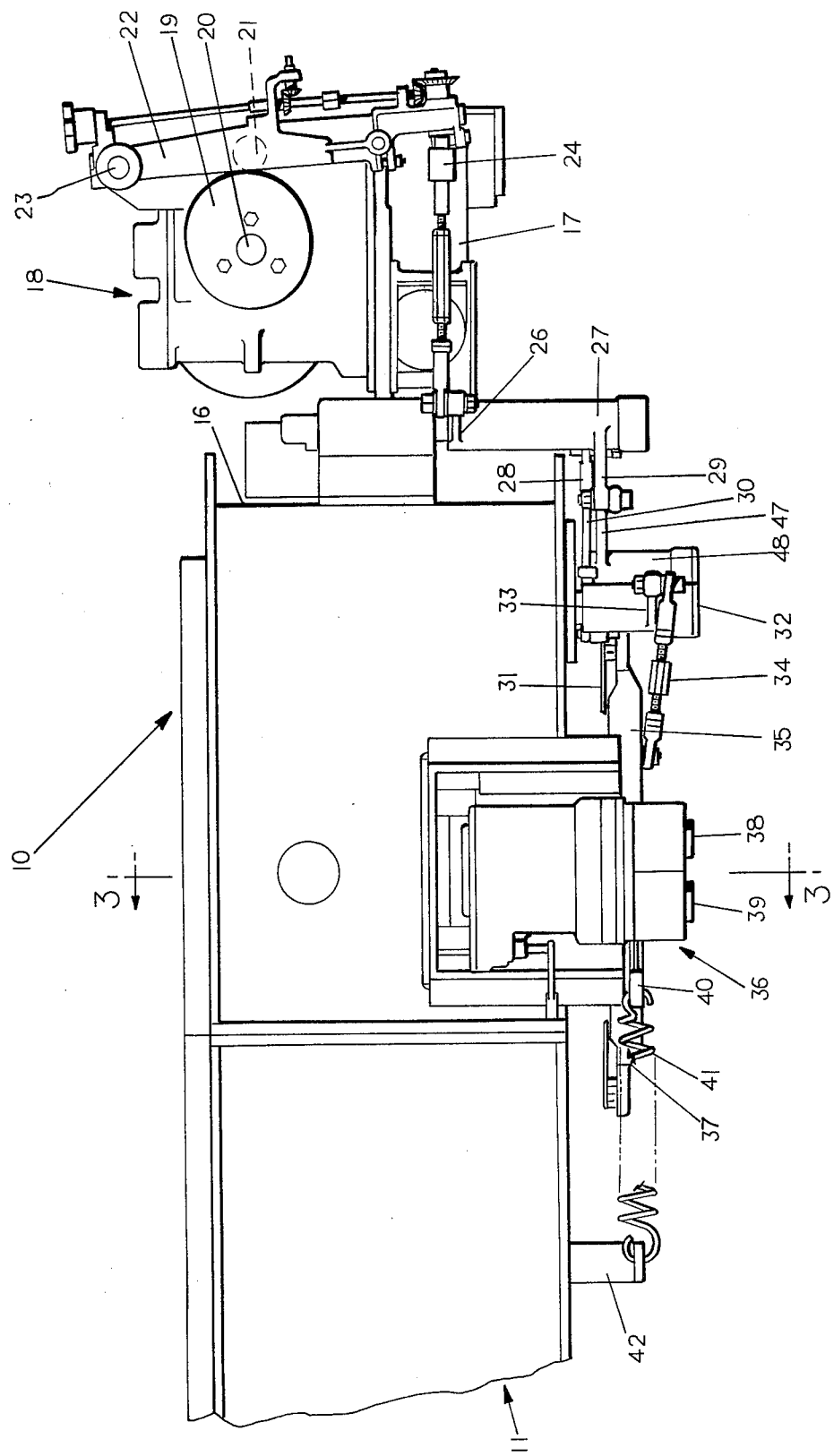
FIG. 1 is a side elevational view of the apparatus of the invention.
Figure 2:
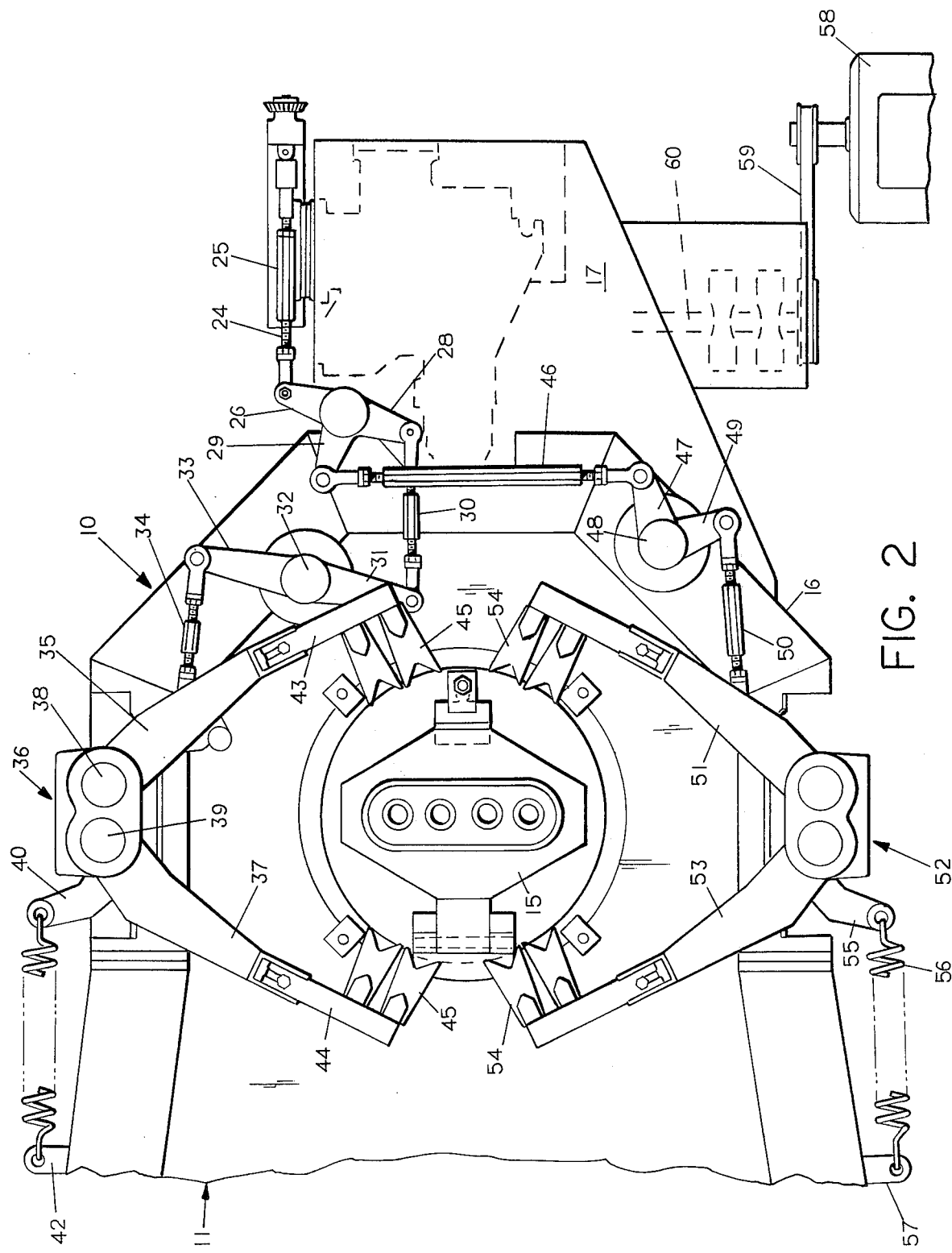
FIG. 2 is a bottom plan view of the apparatus of FIG. 1.

As shown specifically in FIG. 1, a cam 19 which is rotatable about its axis 20 is engaged by a follower 21. The follower 21 is carried intermediate the length of a lever 22. The lever 22 is pivotally supported at its upper end, as viewed in FIG. 1, at 23. The lower end of the lever 22 is connected to a generally horizontal linkage 24 which is provided with an adjustable portion 25 in its length. The adjustable portion takes the form of a threaded sleeve in which the ends of the linkage 24 are threaded. The linkage 24 is connected to one end of a bellcrank arm 26. Arm 26 extends outwardly from a tubular member 27 which serves as the main body of the bellcrank and the tubular member is rotatable about its longitudinally axis by the crank. The tubular portion 27 also carries two additional crank arms 28 and 29. Crank arm 28 is connected by an adjustable link 30 to the extending end of another crank arm 31 which extends from the bellcrank 32. Bellcrank 32 is similar to the tubular bellcrank 27 and has an outward, generally radially extending, crank arm 33. The crank arm 33 is connected by a link 34 to one arm 35 of a first pair of shear arms, generally designated as 36. A second shear arm 37, which is geared to the first shear arm 35, together, constitute the first pair of shear arm 36. It should be understood that the shear arm 35 rotates about the axis 38 while the shear arm 37 rotates about the axis 39. The mounting for the shear arm 37 also carries an integram, extending boss 40 which is provided with an opening through which the end of a spring 41 is connected. The opposite end of the spring 41 is connected to a boss 42 that is fixed to the forehearth superstructure. The ends of the arms 35 and 37 carry shear blade holders 43 and 44. Each of the holders, as shown in FIGS. 2 and 3, is provided with mechanism to hold two shear blades 45. As previously alluded to, the shear arms 35 and 37 are provided with intermeshing spur gears, one of which is shown schematically in FIG. 3. It should be apparent that the two arms 35 and 37 will move in opposite directions through equal arcs when the arm 35 is actuated by cam 19. As previously explained, the tubular member 27 which forms the body of the bellcrank has the arm 29 extending outwardly therefrom and a link 46 is connected thereto. This link 46 has its opposite end connected to a bellcrank arm 47. The bellcrank arm 47 is connected to a tubular member 48 which forms the hub, or body, of a bellcrank. A lower crank arm 49 is connected to a link 50 which in turn is connected to a shear arm 51 which is one arm of a pair of shear arms, generally designated 52. The other arm of the pair of shear arm 52, is designated as 53. It should be noted that the arms 51–53 are essentially identical to the arms 35 and 37 and have shear blades 54 mounted at the ends thereof. The shear arm 53 carries a boss 55 to which a spring 56 has one end connected with the other end of the spring being connected to a fixed boss 57 on the structure of the forehearth.

As can be seen schematically in FIG. 2, a motor 58, through belt drive 59, drives a shaft 60 which, through suitable gearing, in turn drives the shaft 20 carrying the cam 19.

With the apparatus as disclosed it can be seen that upon rotation of the cam 19 the shear blades 45 and 54 and their supporting arms are moved into cutting positions beneath the orifices in the orifice pan 15, simultaneously operating to sever, in the illustrated arrangement, four gobs of molten glass. Obviously, if there were six orifices provided in a row, each shear arm would be provided with an additional shear to in effect provide a mechanism for simultaneously shearing six gobs at a time.

I claim:

1. Apparatus for shearing four or more streams of molten glass into gobs simultaneously comprising a motor driven cam, a lever pivoted at one end to a fixed support and with its other end movable, a cam follower carried by said lever intermediate its ends, a connecting rod connected to said movable end of said lever, a first bellcrank;

means connecting said rod to said first bellcrank, a pair of output crank arms connected to said first bellcrank, a second bellcrank, linkage means connecting said second bellcrank to the output of the first bellcrank, a third bellcrank, linkage means connecting said third bellcrank to the other output of the first bellcrank, a first and second pair of shear blade carrying arms, each said pairs of arms being mounted for equal and opposite simultaneous movements about adjacent pivot axes, two or more shear blades carried at the ends of said arms opposite the pivot axis, a molten glass feeder having four or more downwardly extending orifices for discharging four or more streams of glass simultaneously, each pair of shear arms being pivoted between a position where its blades overlap on the axis of two or more streams and the other pair of shear arms having its blades pivoted to overlap on the axis of the other two or more streams of glass, and linkage means from said second bellcrank to one arm of said pair of shear arms for operating said pair of shear arms to sever said streams into gobs, and linkage means from said third bellcrank to one of said other pair of shear arms for actuating said other pair of shear arms at precisely the same moment as the operation of the other shear arms whereby four or more streams of glass are simultaneously severed into gobs.

2. The apparatus of claim 1 further comprising means connected to one of each pair of shear arms for biasing said arms in the opening direction to thereby retain the cam follower in contact with the cam.

3. The apparatus of claim 1 wherein said connecting rod is adjustable in length to change the relationship of the cam to the first bellcrank.

* * * * *